United States Patent
Datar et al.

(10) Patent No.: US 6,351,812 B1
(45) Date of Patent: Feb. 26, 2002

(54) METHOD AND APPARATUS FOR AUTHENTICATING PARTICIPANTS IN ELECTRONIC COMMERCE

(75) Inventors: Rajendra Datar, Clinton; Daniel F. Hurley, Marlboro; Vishwa Prasad, Matawan; Earle H. West, Morganville, all of NJ (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/923,512

(22) Filed: Aug. 7, 2001

Related U.S. Application Data

(63) Continuation of application No. 09/148,546, filed on Sep. 4, 1998.

(51) Int. Cl.[7] .................................................. G06F 9/00
(52) U.S. Cl. ...................... 713/182; 713/164; 713/165; 713/168
(58) Field of Search ................................. 713/182, 155, 713/164, 165, 168, 169

(56) References Cited

U.S. PATENT DOCUMENTS 5,163,131 A * 11/1992 Row et al. .................. 709/200
5,802,366 A * 9/1998 Row et al. .................. 709/283

* cited by examiner

*Primary Examiner*—Thomas R. Peeso
(74) *Attorney, Agent, or Firm*—Robert B. Levy

(57) ABSTRACT

A participant (14) in electronic commerce can validate his/her own certificate (24, 31) by accessing an authority (28, 32) that checks whether the participant's certificate is valid. If the certificate is valid, the authority embeds with the participant's terminal (12) a block of data, in the form of a Cookie (28, 30) that includes a plurality of attributes indicative of the certificate, for example, the certificate's date of expiration. When accessing a secure application (16), the participant presents both the certificate and the authenticating Cookie, obviating the need for a real-time inquiry to the authority, unless the Cookie is stale or missing.

19 Claims, 9 Drawing Sheets

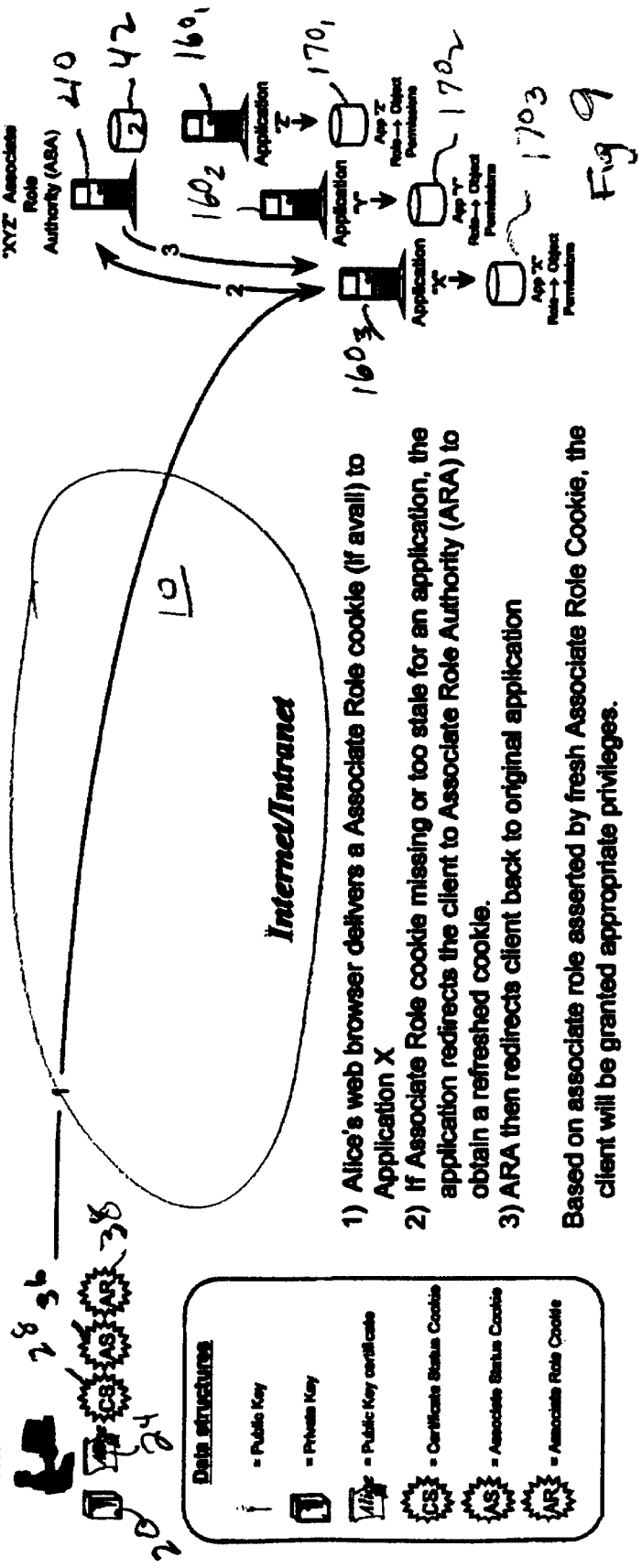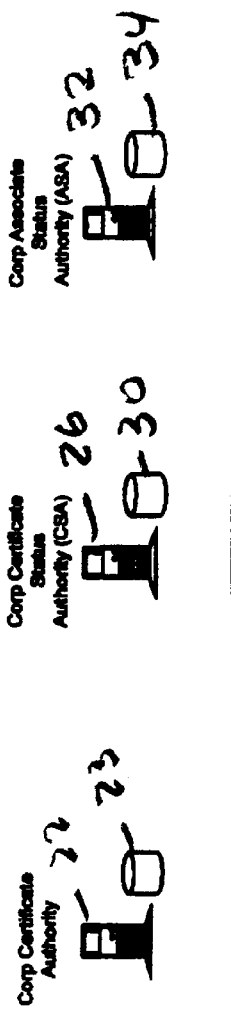
Fig 9

METHOD AND APPARATUS FOR AUTHENTICATING PARTICIPANTS IN ELECTRONIC COMMERCE

This application is a continuation of Ser. No. 09/148,546 filed Sep. 4, 1998.

TECHNICAL FIELD

This invention relates to a technique for verifying the authenticity of participants engaging in electronic commerce.

BACKGROUND ART

Today, individuals, businesses, and other organizations conduct an ever-increasing amount of commerce electronically either via private interconnected networks, ("intranets") or via a public interconnected network such as the Internet. For example, many businesses now exchange all types of documents, such as purchase orders, memorandums, contracts, and request for proposals, for example with other businesses and organizations. Many individuals, businesses, and organizations now purchase and sell all types of goods and services electronically. Indeed, some businesses sell exclusively over the Internet and maintain no retail place of business at all.

In most instances, authentication of an individual, or that individual's computer terminal, must occur before that individual can engage in commerce. The manner of authentication depends on the type of encryption used to protect transmitted data. Typically, most electronic commerce relies on public key/private key encryption. Generally, senders encrypt data with a symmetric key and then encrypt the symmetric key with the recipient's public key and send it with a document. Electronic certificates have emerged as the standard method of authenticating an individual's public key. In fact, the International Telecommunications Union (ITU) has established Standard X.509 for such electronic certificates and most individual web browsers and network servers support that standard. Entities, known as Certificate Authorities (CAs) exist to create and distribute such electronic certificates.

Despite the existence of an ITU standard for electronic certificates, problems remain that have impeded the use of such certificates to facilitate electronic commerce. One such problem is verifying that a presented certificate has not been revoked. For example, certificate revocation may occur as the result from compromise of an associated private key. Alternatively, an individual might change his or her public key. In practice, CAs maintain a local record of revoked certificates and periodically generate and publish from these local records lists of revoked certificates, known as Certificate Revocation Lists (CRLs), that report a snapshot of which certificates have been revoked.

The revocation status of a certificate is hereinafter referred to as the certificate's "validity." The process for determining the revocation status of a particular certificate will hereinafter be referred to as "validating" the certificate. There are two approaches employed to validate a certificate. The first approach is to search through the current CRL(s) during certificate verification operation. This approach has the following shortcomings:
1. The CA must deliver a copy of each revision of the CRL to every secure application
2. These redundant copies of CRL must be cached by every secure application
3. Applications that do not have a facility for caching the CRL will need to request the entire CRL during each certificate validation process
4. Each application is burdened with searching through the CRL list during every certificate verification operation
5. Applications must acquire entire CRL in order to verify a single certificate's status
6. CRLs become outdated and can therefore be inaccurate
7. Determination that a particular certificate is not on the current CRL may lead an inquiring party to conclude that the certificate in question is valid, when in fact, no certificate exists.

Another approach to certificate validation is to undertake a Real-time inquiry of the CA or a Certificate Status server. This approach, for which an implementation protocol as been proposed (Internet draft X.509 Internet Public Key Infrastructure—Online Certificate Status Protocol—OCSP), has the following shortcomings:
1. Real-time access of the CA/Certificate Status Server does not afford scalability
2. This approach is very expensive in terms of network resources
3. Real time CA/Certificate Status Server inquiry inserts network latency into every certificate verification operation
4. The CA/Certificate Status Server must participate in every certificate verification operation.
5. This approach does not allow applications to implement any application-appropriate policy with respect to the required freshness of the certificate status information
6. Each application must execute an inquiry to the CA for the status of that certificate upon presentation to each different application, potentially resulting in the CA answering the same inquiry repeatedly.

In recognition of the scalability shortcomings of the second (real-time query) approach, an extension to the OCSP proposal has been submitted as another internet draft (Internet Public Key Infrastructure—Caching the Online Certificate Status Protocol) to remedy such shortcomings. The Internet draft proposes a mechanism for caching certificate status responses issued by certificate status authorities in intermediate servers so the primary certificate status server does not have to respond directly to every request. Even as modified with the intermediate server caching mechanism, the real-time query approach still suffers from the following shortcomings:
1. This approach requires deployment of intermediate servers
2. Use of intermediate servers is very expensive in terms of network bandwidth
3. Use of intermediate servers does not allow applications to implement application-appropriate policy with respect to the required freshness of the certificate status information
4. As a certificate is presented to different applications during the course of a day, each application must execute an inquiry to some certificate status server (intermediate of primary) for the status of that certificate, resulting in those servers answering the same inquiry repeatedly.

To avoid the problems associated with of the delay in updating certificate validation, some Certificate authorities have experimented with issuing short-lived certificates that cannot be revoked. All certificates that comply with the X509v3 standard have a validity period that defines both the start and end of a certificates period of validity. By choosing a very short period, a CA can issue a certificate that will likely not be revoked prior to expiration. This approach incurs the following disadvantages:
1. Frequent certificate re-issuance imposes a burden on the CA, the network, and the users
2. An application may be unable to determine if a certificate is no longer valid. (Applications must assume that certificates that have not expired are still valid.)

3. This approach does not address the issue of non-existent certificates.

Thus, there is a need for a technique for authenticating participants in electronic commerce that overcomes the aforementioned disadvantages of the standard approaches to certificate status verification. In particular, there is a need to overcome the shortcomings of real-time query of the CA which are (1) very expensive in terms of network resources, (2) insertion of network latency in every certificate validation operation and (3) involvement of the CA in each validation operation. There is also a need to overcome the disadvantages of acquiring, caching and searching each CRL, which are (1) requiring redundant CRL copies cached with each resource, and (2) burdening each server with searching through the CRL during each certificate validation operation.

BRIEF SUMMARY OF THE INVENTION

Briefly, the present invention provides a method for conveying to an application during the authentication process, revocation status information regarding an electronic commerce participant's authentication certificate that overcomes the aforementioned shortcomings of the current art. The invention improves on present art by relying on participants to obtain, cache, and deliver the status information to applications through a process that allows applications to enforce application-appropriate policy regarding the required "freshness" of that status information and, thereby, optimize the efficient use of network and status server resources.

The validation process commences upon receipt by a status authority of an inquiry regarding the revocation status of one or more credentials ("other information), such as a public key certificate, held by a participant. This inquiry is triggered during an authentication process upon determination by an application that 1) The participant does not possess the status information for the other information presented by that participant (and therefore did not deliver it to the application), or
2) Status information for the other information in question was delivered but deficient in some way, based on the application's local policy. In particular, the status information may be too stale.

Upon receiving the status inquiry, the status server determines the status of the other information and formulates a response consisting of a block of data that contains a plurality of attributes about the other information. In the case of a public certificate, such attributes would include the identity of the certificate, a timestamp, the status of the certificate (e.g., "not revoked", "revoked", "unknown", "suspended", etc.), and, if revoked, revocation date, revocation reason, etc., and finally, a digital signature of the aforementioned attributes.

The following discussion of several embodiments of the invention, and subsequent detailed descriptions of the associated processes focus on the use of the present invention in the context of a participant using a web browser to access a web server. That focus is only to simplify the explanation, and should not be construed as a limitation of the applicability of the invention in other contexts.

In one embodiment of the invention, the inquiry originates directly from the participant who issues the inquiry to the status authority spontaneously, possibly as part of a general credential freshening process that participants might perform at the start of a day. In this embodiment of the invention, the status server returns the response to the participant for caching, for example (in the case of a web browser), by inserting it into the participant's browser as a Cookie.

In a second embodiment of the invention, the inquiry originates directly from the participant who has been redirected to the status authority by an application during the authentication process due to some deficiency in the status information as determined by that application. In this embodiment of the invention, an inquiry URL includes a return URL. The status server returns the response to the participant for caching (as with the previously described embodiment) and redirects the participant back to the return URL specified in the inquiry.

In a third embodiment, the inquiry originates directly from an application in order to acquire other information status (e.g., certificate status) for such other information presented to the application by a participant during an authentication process. This embodiment may be employed for any number of reasons, including for example, if the status authority is part of a foreign domain and, therefore, cannot issue a Cookie for the application's domain. In this embodiment of the invention, the status server returns the response to the inquiring application and the application in turn, returns the response to the participant for caching (as with the first embodiment of the invention).

When the participant accesses a web site that demands certificate-based authentication, the web site can verify the signature of the participant's certificate and then, if desired, perform the certificate validation process. The process entails examination of the certificate status information delivered to the application by the participant to determine 1) if it is present, 2) if the timestamp is not too old, and 3) if it indicates the certificate exists and has not been revoked. Depending on the circumstances, including the configuration of the application, if the application determines that the status information is missing or deficient in some way, the application may make an inquiry directly, or may direct the participant to make the inquiry.

The method of the invention affords several advantages over the current approaches described previously. First, the invention caches certificate status information, i.e., responses issued by status authorities, with the user. By caching such status information, the participant can deliver such status information to the application during authentication. Thus, the method of the invention affords the advantage that applications need not obtain and cache the status information from a third party. Additionally, the invention affords the advantage that applications examine the status information provided by the client and determine if it is adequate based on application-appropriate policies regarding the freshness of the information. Only if such status information is too stale for a particular application's policy, the user client is redirected to the appropriate certificate status authority to refresh the information.

BRIEF DESCRIPTION OF THE DRAWINGS

FIG. 9 illustrates the manner in which an electronic commerce application obtains an Associate Status Role Cookie from an Associate Status Role Authority if a participant's Associate Status Role Cookie is missing or stale.

DETAILED DESCRIPTION

Figure 1:
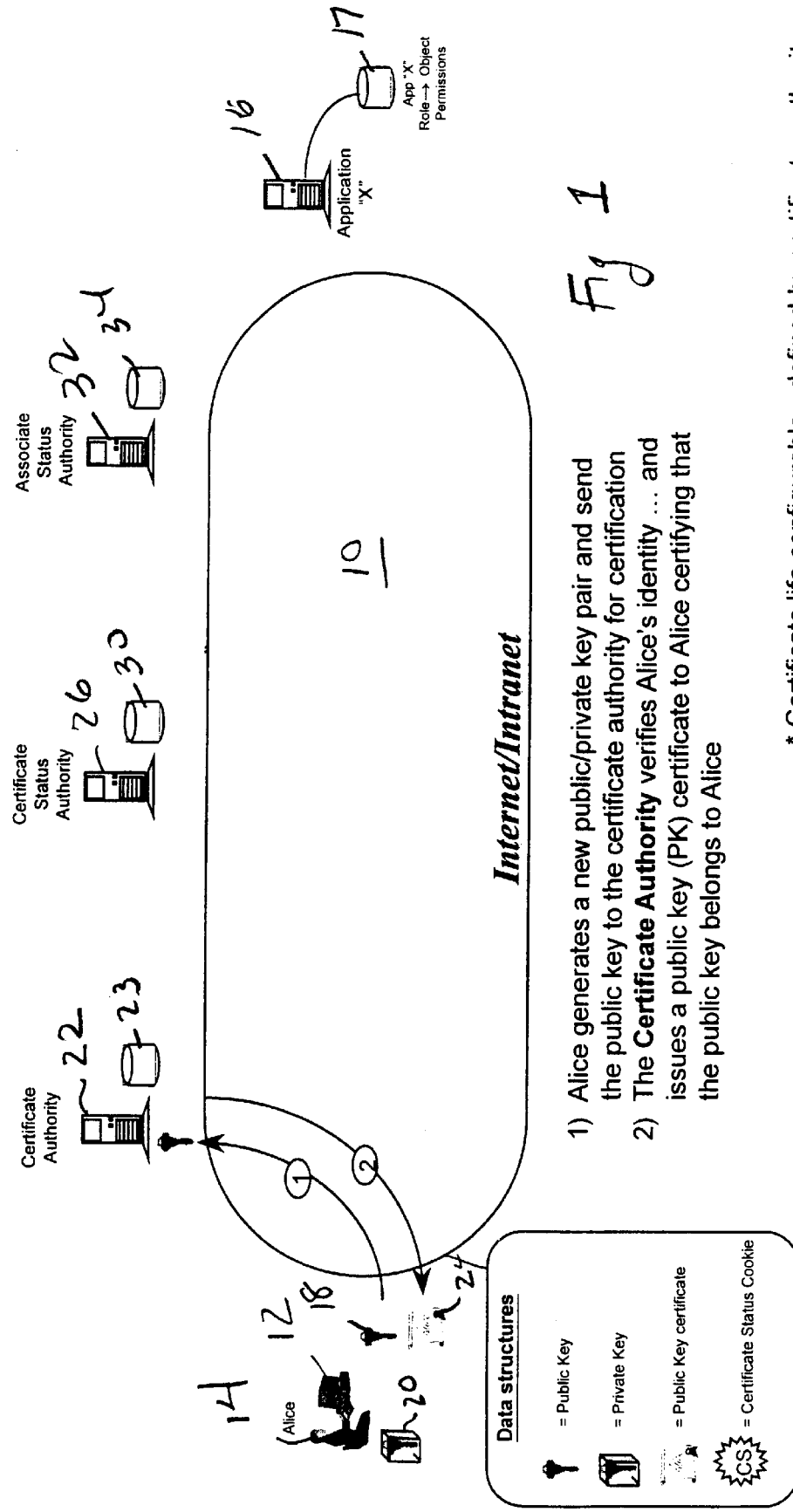
FIG. 1 illustrates the manner in which a participant of electronic commerce obtains a certificate from a Certificate Authority verifying the participant's public key.

FIG. 1 illustrates a network 10 for interconnecting a computer terminal 12 of an individual 14 to an application 16 to enable the participant to interact with the application, and thus engage in electronic commerce. The network 10 may take the form of a private Intranet accessible to certain individuals, such as the participant 14. Alternatively, the network 10 may comprise a public network, such as the Internet, or a combination of a plurality of Intranets linked by the Internet, through which a plurality of participants may gain access. The terminal 12 may comprise a simple "dumb" terminal or a computer having the appropriate network access device, such as a modem, LAN/WAN circuit board, or ISDN adapter.

The application 16 may take a variety of different forms. For example, the application 16 may take the form of a web site maintained by a merchant from whom the participant 14 wishes to buy goods and/or services delivered separately from the individual's access of the application 16. Alternatively, the application 16 may provide the participant 14 through the network 10 with a fee-based service, such as entertainment and/or information. In some instances, the application 16 may restrict access only to certain individuals, such as company employees who seek access from remote locations.

In the illustrated embodiment, the application 16 constitutes a secure application. In other words, the application 16 requires authentication of each participant seeking to access the application, and to that end, the application includes a database 17 for maintaining records of those authorized to access the application. For purposes of the invention, a participant, such as the participant 14, seeking authentication does so using a public key/private key encryption scheme as is known in the art. Typical public key/private key encryption schemes require that a participant identify a known public key 18 used by the application 16 to decrypt information encrypted by the participant using a private key 20. Thus, prior to accessing the application 16, a participant, such as participant 14 first selects (generates) his or her public key 18 and private key 20.

To assure the application 16 can decrypt the private key-encrypted information from the participant 14 using the selected public key 18, the participant often will seek certification of the association of his/her identity with his/her public key 18. The participant 14 seeks such certification by transmitting his/her identity and the public key 18 to a Certificate Authority (CA) 22 connected to the network 10. In response to a certificate request from the participant 14, the CA 22 will authenticate participant 14—i.e., verify the transmitted identity of participant 14—through some mechanism that may include verification that participant knows a password assigned to that identity, such assignment stored in database 23, to ensure that certification of the association of the public key identified by the participant with the transmitted identity is appropriate. When the CA 22 has verified the association of the transmitted public key and identity, the CA 22 will issue a certificate 24.

The certificate 24 issued by the CA 22 typically has a predetermined life span set by the CA. For example, the certificate 24 may have a life span of 3 months, 6 months, or even one or more year(s). Upon expiration, the certificate becomes invalid. Thus, when the participant's certificate 24 expires, the participant 14 can no longer represent the authenticity of his/her public key. Alternatively, in some instances, the CA 22 may revoke the certificate 24 of a participant, such as participant 14, even though the certificate has yet to expire.

Heretofore, determining the validity of public key certificates has proved problematic. Previously, a Certificate Authority (CA) 22 would publish a Certificate Revocation List (CRL) from local database (not shown) listing revoked and/or invalid certificates. An application, such as application 16, seeking to verify the validity of a participant's public key 18 would query the CA 22 in real time, or check the most recent published CRL. Both of these processes, real-time inquiries as well as periodic requests for the recent CRL, consumed scarce network and CA resources, and the CRL checking method imposed additional caching and searching burdens on the applications. In addition, these processes must be performed repeatedly by each application accessed by the participant, resulting in redundant queries and redundant copies of the CRL data.

Figure 2:
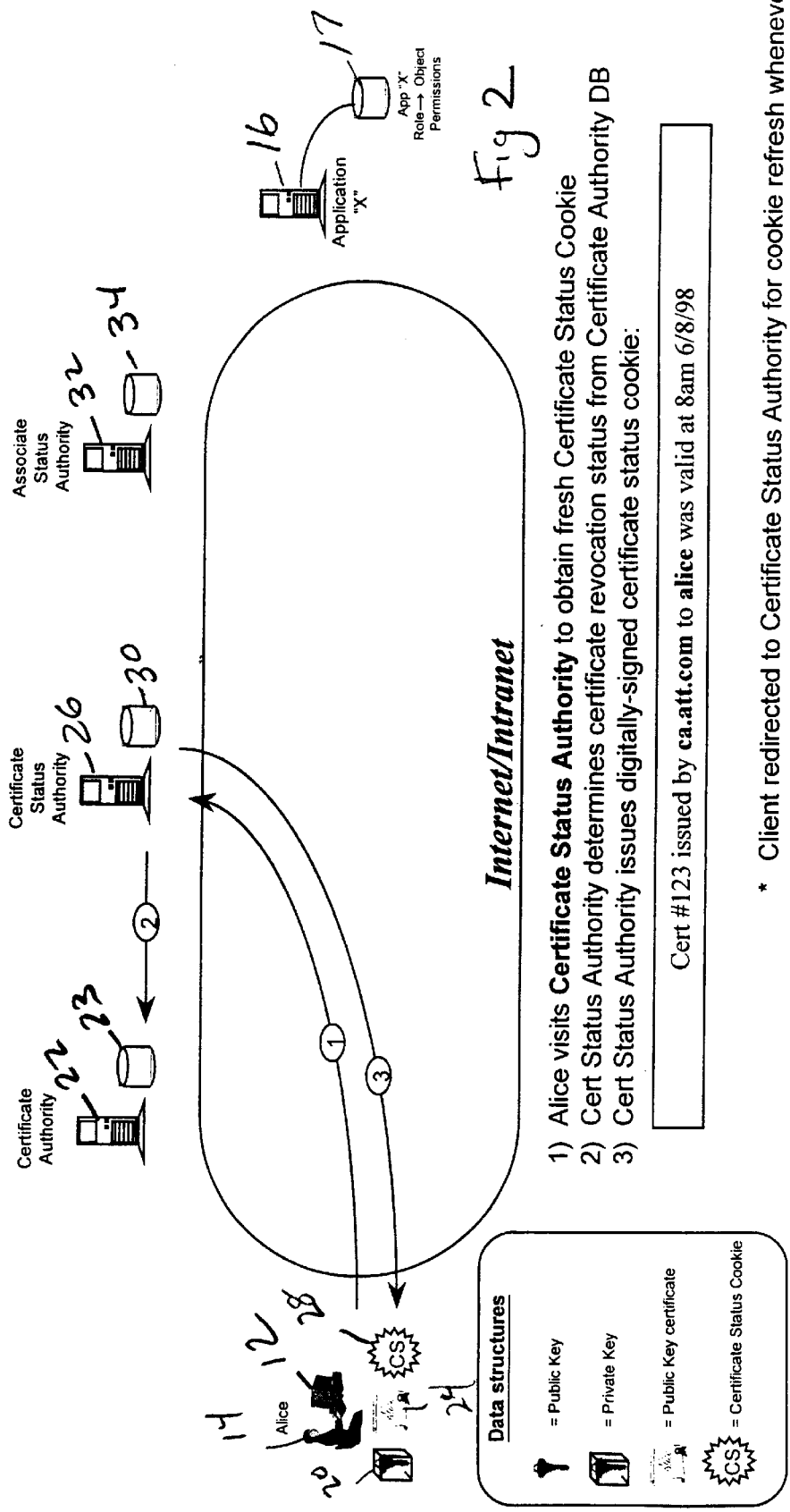
FIG. 2 illustrates the manner in which the participant of electronic commerce acquires embedded data (i.e., a "Cookie") that includes attributes regarding the revocation status of the participant's certificate.

Referring to FIG. 2, the present invention overcomes foregoing problem by allowing the participant 14 to obtain data, in the form of a Certificate Status Cookie 28 embedded in the browser utilized by the participant's terminal 12. The Cookie 28 includes a plurality of attributes regarding the participant's certificate 24 to enable validation of that certificate by a secure application, such as the application 16. Stated another way, the present invention provides a method for enabling the participant to obtain a second mechanism, in the form of Cookie 28, that validates the participant's certificate 24.

To overcome the need for the application 16 to verify, in real time, the validity of the certificate 24, the participant 14 seeking validation of his/her certificate may access a Certificate Status Authority (CSA) 26 in advance of accessing the application 16. Upon receipt of a validation inquiry from the participant 14, the CSA 26 determines the status of certificate 24 held by the participant by accessing a database 30. The CSA then provides the terminal 12 of the participant with the Cookie 28 that comprises a digitally signed document in the form of data embedded in the browser in the terminal 12. The Cookie 28 includes a plurality of attributes descriptive of the certificate 24. For example, the Cookie 28 typically includes the identity of the certificate, a timestamp, the status of the certificate (one of "not revoked", "revoked", "unknown"), and, if revoked, revocation date, revocation reason, etc., and finally, a digital signature of the aforementioned attributes.

A major advantage gained by having the participant 14 acquire the Cookie 28 from the CSA 26 is that such validation of the certificate 24 need not occur in real time. As will be discussed below in greater detail, an application, such as the application 16, seeking to verify the validity of certificate 24 of the participant 14 need not query the CSA 26 each time the participant seeks to execute the application. Rather, the application 16 need only examine the Cookie 28 of the participant 14 to authenticate the participant's certificate 24. If the Cookie is valid, there is no farther network traffic to and utilization of resources of, CSA 26. Only if the Cookie 28 is deemed "stale"(i.e., the date upon which the participant obtained the Cookie is too old for the application policy) or the Cookie does not exist will the application 16 (or the participant 14) need to query the CSA 26. Moreover, the use of the Cookie 28 allows different applications to establish different validation levels. For example, one application may rely on certain attributes contained in the Cookie which another application can rely on other attributes.

Figure 3:
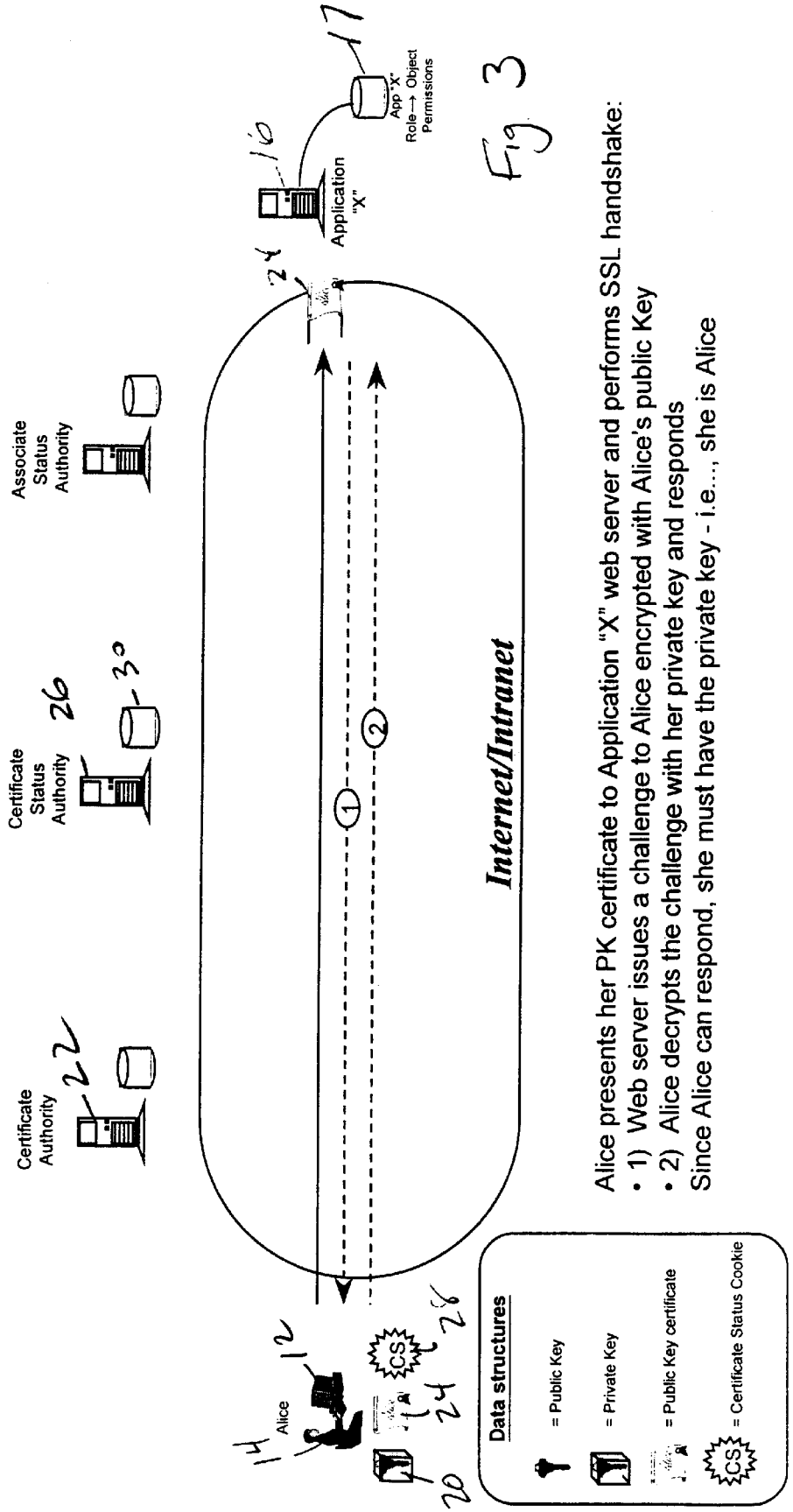
FIG. 3 illustrates the manner in which a participant of electronic commerce executes an application that requires authentication of the participant's certificate.
Figure 7:
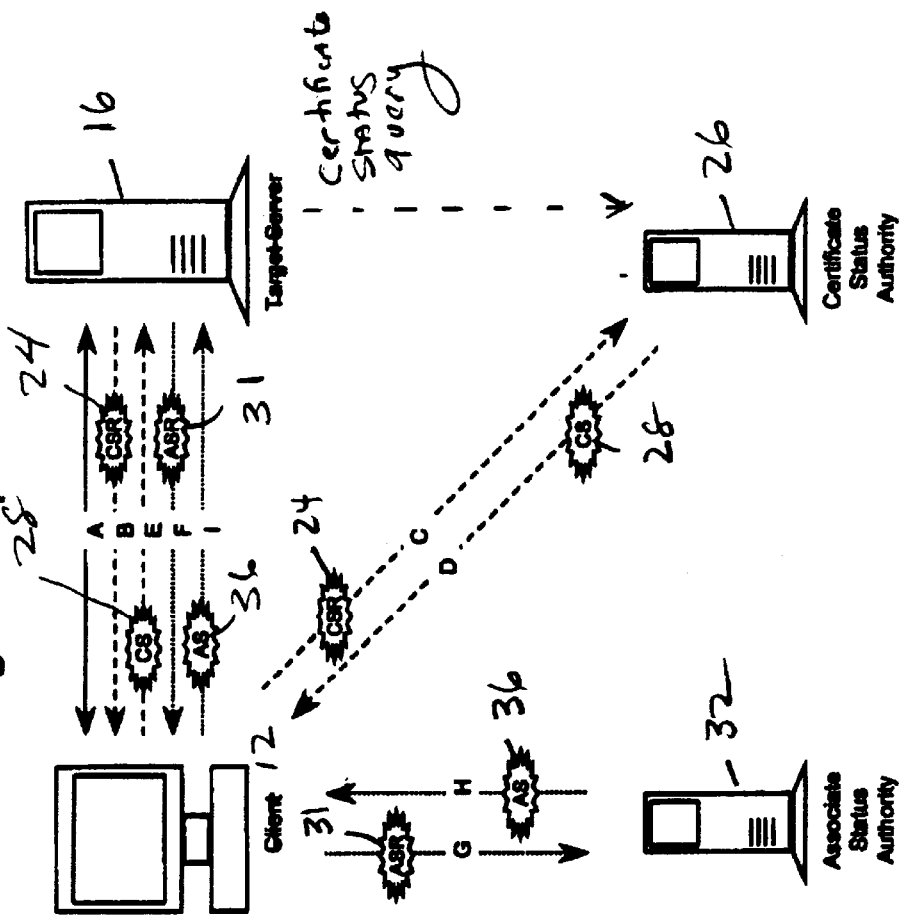
FIG. 7 illustrates the complete protocol for certificate and Associate Status checking.

To better understand the Cookie-based certification method of the invention, refer now to FIG. 3, and to FIG. 7, the latter illustrating the certificate checking protocol. When the participant 14 seeks to access, via the participant's terminal 12, the application 16, the participant 14 presents his/her certificate 24 to the application and performs a standard Secure Socket Layer (SSL) handshake. Following receipt of the participant's certificate 24, the application 16 issues a challenge to the participant 14 encrypted using the participant's public key 18. The participant 14 then responds by decrypting the challenge using the participant's private key 20. If the participant can respond, then the participant has confirmed that he or she possesses the associated private key.

Figure 4:
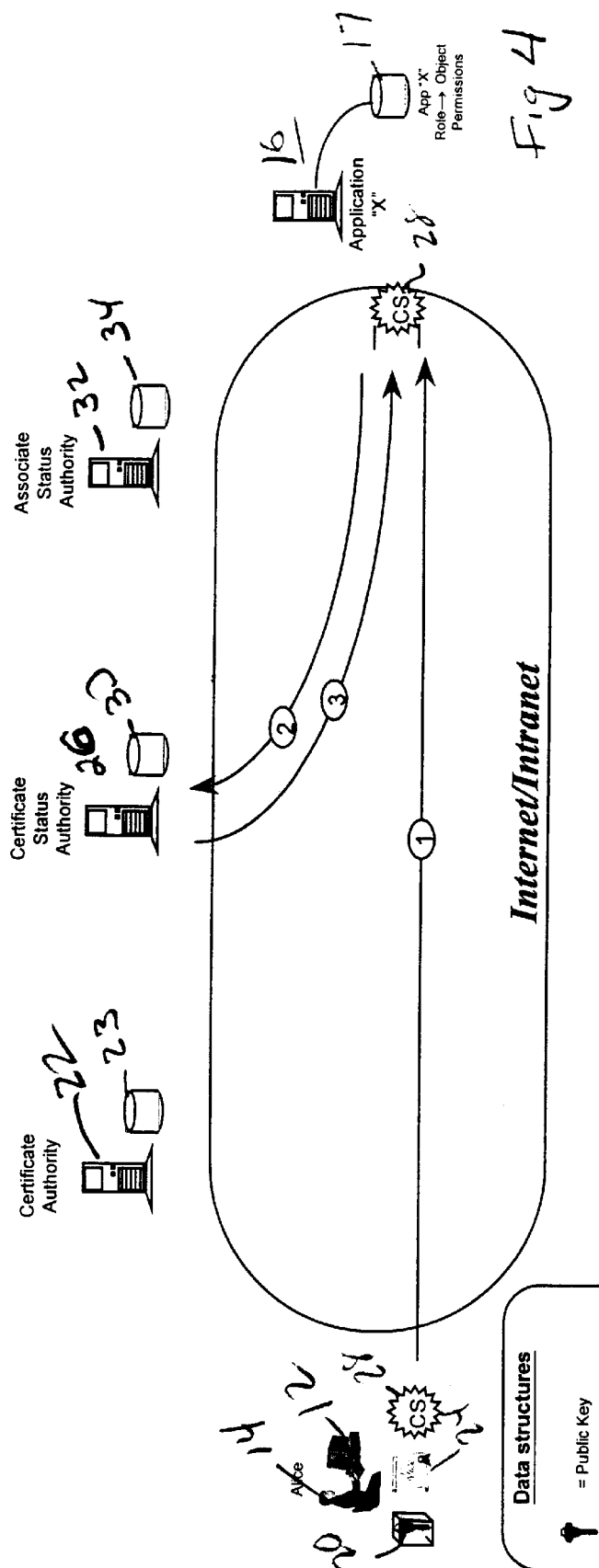
FIG. 4 illustrates the manner in which an application obtains verification of the participant's certificate when the Cookie is too old or stale, or missing entirely.

Referring to FIGS. 4 and 7, after responding successfully to the SSL challenge, the participant 14 delivers, from his or her terminal 12, the Cookie 28 (if available) to the application 16 to certify the status of the participant's certificate 24. If the Cookie 28 is current and indicates that the certificate is valid, the process of authentication is complete. If the Cookie 28 is stale or non-existent the application 16 will direct the participant to the CSA 26 to obtain a refreshed Cookie.

Should the participant 14 lack a current Cookie 28, an inquiry to the CSA 26 will be launched. In the embodiment of invention illustrated in FIG. 4, the participant is redirected to CSA 26, to obtain the refreshed Cookie, and is redirected back to application 16. In another embodiment of the invention, application 16 issues the inquiry directly to CSA 26, obtaining the status information in return (and forwards it to the participant for caching, for example, in the case of a web browser, in the participant's browser). In either case, the application 16 now has current certificate status information and can make a decision regarding whether to allow the participant access. Also, if there are other applications similar to application 16, the same Cookie 28 can be used.

The Cookie-based certification technique described above can be used to deliver information about participant 14 to an application regarding matters other than the participant's public key certificate 24. For example, the technique of the invention can be used to deliver a certified statement regarding the participant's employment status to facilitate access by the participant 14 to an application, such as application 16, that is only accessible to employees, or a select category of employees. Thus, to allow access by the participant 14, the application 16 must verify the participant's employment status.

Referring to FIG. 1, previously the application 16 would verify the participant's employment status in a manner similar to verifying the participant's certificate 24. Upon receipt of an inquiry from the participant 14, the application would query an Associate Status Authority (ASA) 32, which would access its associated database 34 to determine whether the participant's associate certificate 31 is valid. As with prior real-time certificate verification, real-time status associate certificate verification consumes precious system resources.

Figure 5:
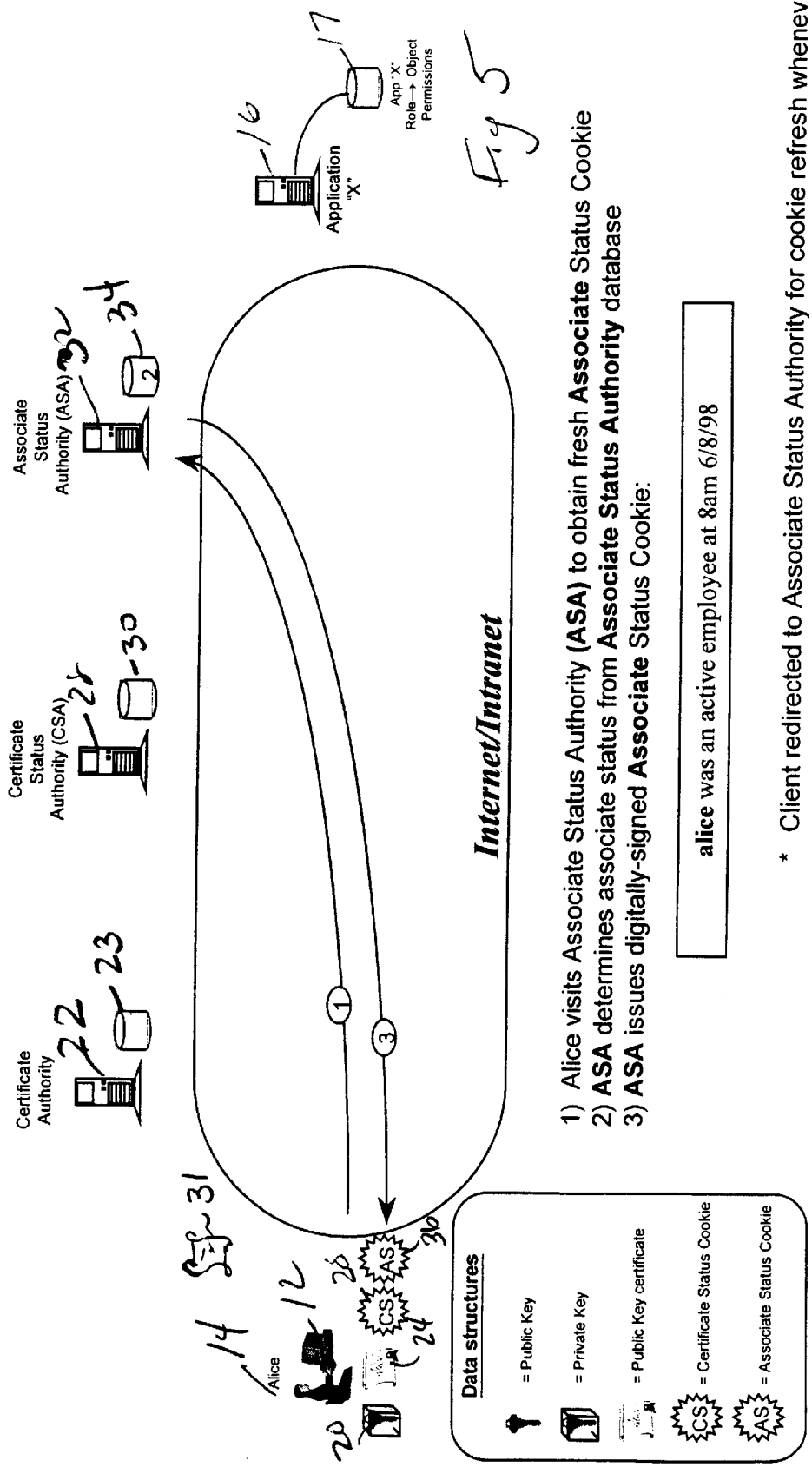
FIG. 5 illustrates the manner in which a participant of electronic commerce obtains a fresh Associate Status Cookie from an Associate status Authority for authenticating a participant's status other than in condition with certificate status.

Referring to FIG. 5, a participant, such as participant 14, seeking access to status-restricted application, such as application 16, would first visit (access) the ASA 32 to obtain a fresh Associate Status Cookie 36. Just as the CSA 28 provides the participant 14 with the Cookie 28 that includes attributes indicative of the participant's certificate 24, the ASA 32 provides the participant with an Associate Status Cookie 36 that includes attributes indicative of the participant's status. For example, the Associate Status Cookie 36 may include embedded data for retention by the web browser in the participant's terminal 12. Such embedded data would indicate that the participant is a current employee as of a particular date just as the Cookie 28 embedded in the browser certifies the validity of the participant's certificate 24. Indeed, the Associate Status Cookie 36 may not only indicate the participant's employment status, but may indicate the participant's rank, such as supervisor, manager, director, president, etc. Like the Cookie 28, the Cookie 36 may include attributes such as typically includes the identity of the associate, a timestamp, the status of the associate (e.g., "employed", "terminated", "leave of absence", "retired", etc.), and any other attributed related to the associate, and finally, a digital signature of the aforementioned attributes.

Figure 6:
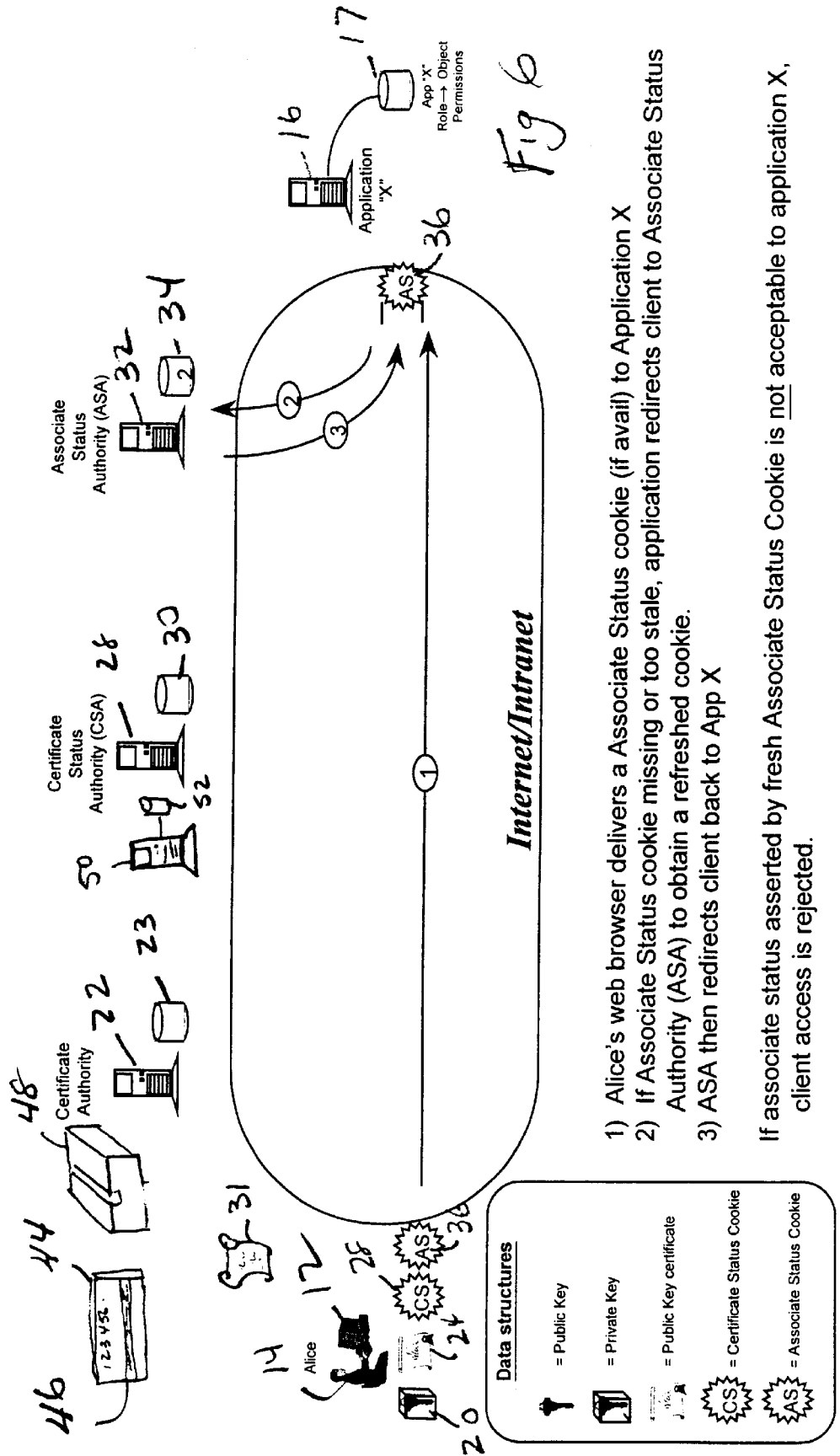
FIG. 6 illustrates the manner in which an electronic commerce application obtains an Associate Status Cookie from an Associate Status Authority if a participant's Associate Status Cookie is missing or stale.

Referring to FIGS. 6 and 7, when the participant 14 seeks access through his or her terminal 12 to the application 16 which is status-restricted, the participant first provides his or her Cookie 28. Assuming the Cookie 28 certifies that the certificate is valid, the participant then provides the Associate Status Cookie 36. Following an identical process, application 16 can obtain Associate Status information upon which it can base a decision to grant participant access. As with the Certificate Status Cookie 28, if the Associate Status Cookie 36 is stale or not available, then the application 16 can either issue an inquiry directly to the ASA 32, or can redirect participant 14 to ASA 32, to obtain a refreshed Associate Status Cookie 36. In the second case, once the ASA 32 has provided the participant 14 with a now-refreshed Associate Status Cookie 36, the CSA directs the participant 14 back to the application 16. If the participant 16 cannot produce a current Associate Status Cookie 28 that certifies that the participant has a status acceptable to application 16, even after being directed to the ASA 26, then the application 16 can reject the participant.

Figure 8:
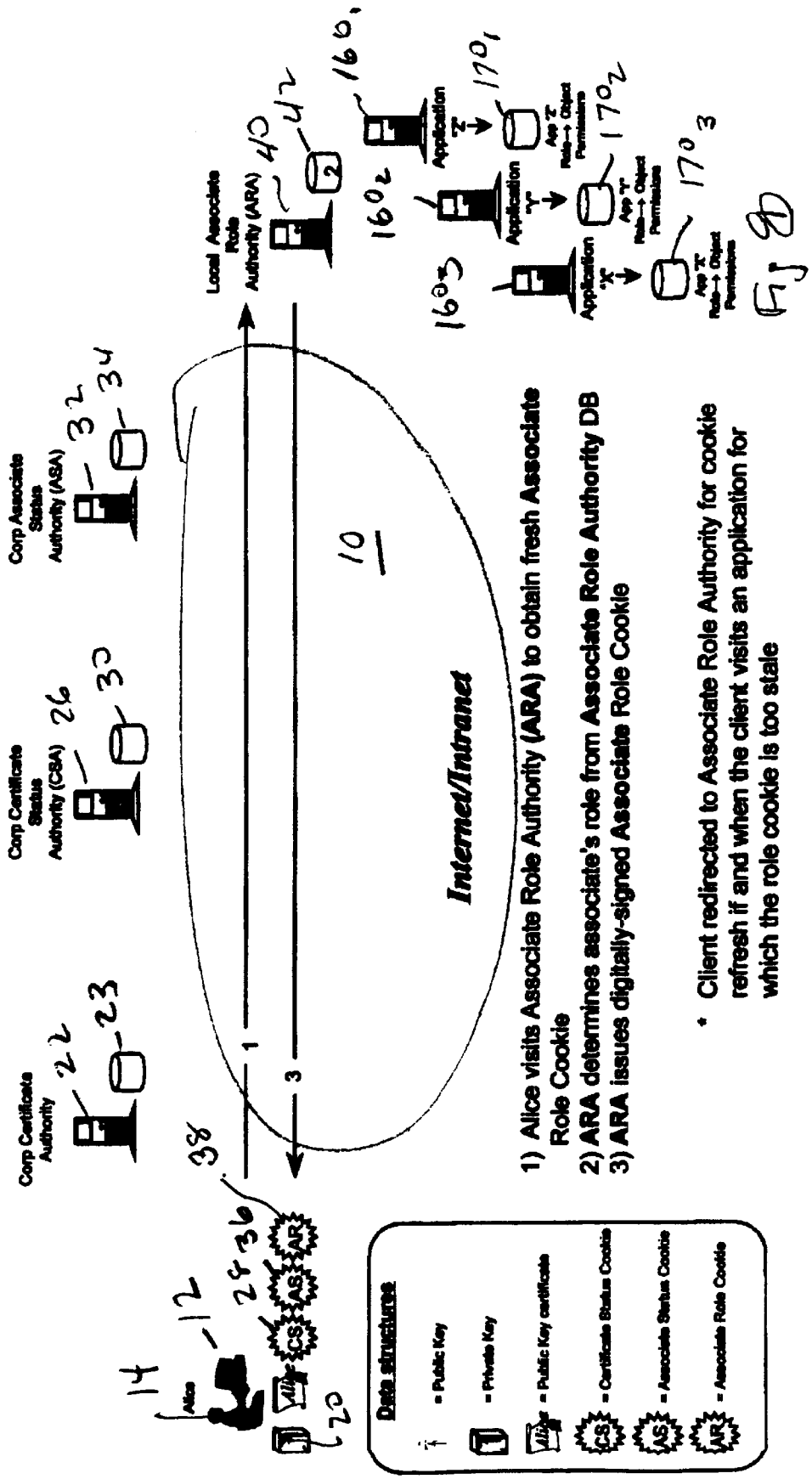
FIG. 8 illustrates the manner in which a participant of electronic commerce obtains a fresh Associate Status Role Cookie from an Associate Status Role Authority for authenticating a participant's role status.

Referring to FIG. 8, in addition to obtaining a Certificate Status Cookie 28, an Associate Status Cookie 36, the participant may also seek to obtain an Associate Role Cookie 38 from an Associate Role Status Authority 40 having an associate database 40. For instance, the participant, when seeking access to one or more of applications $160_1$, $160_2$ and $160_3$, may need to validate his or her role to which each application would verify via its associated one of databases $170_1$, $170_2$ and $170_3$, respectively. The participant 14 obtains the Associate Role Cookie 38 from the ARA in the analogous manner discussed above for the Certificate Status Cookie 28 and the Associate Status Cookie 36. The Associate Role Cookie 38 contains data representing attributes that identify the participant's role with regard to a particular application.

Referring to FIG. 9, the participant 14 would deliver his or her Associate Role Cookie 38 to the particular one of the applications $160_1$–$160_3$ of interest to the participant that require role validation. If the Associate Role Cookie 38 is missing or state, the application re-directs the participant back to the ARA 40 to obtain a refreshed cookie. The ARA 40 then directs the participant back to the application.

The foregoing discloses a method for authenticating a participant electronic commerce by embedding data, in the form of a Cookie, within the participant's terminal, to identify attributes that authenticate the participant.

The above-described embodiments merely illustrate the principles of the invention. The principles of the invention can be applied in numerous other contexts—both interactive (like web client/server) and "message-oriented" (e.g., email)—where participant-related information, such as the status of the participant's public key certificate, must be conveyed to an application or other "target" accessed by the participant.

For example, the invention can be used to transmit, as part of a multi-part email message, the status of a public key certificate included in such email message in accordance with the S/MIME protocol, thus enabling the message recipient to determine the revocation status of the transmitted certificate without consulting a third party.

Referring to FIG. 6, the invention can be applied in the context of validating a credit card 44, that contains a digitally-signed validity status of the customer's credit account be cached on the customer's credit card (e.g., via a magnetic stripe 46). The digitally signed validity status of the customer's account would be automatically available to a vendors' credit card reader 48 during the "card "swipe" process so that the card reader could determine the validity of a customer's credit card. Thus, the card reader 48 would not need to query a credit card status authority 50 who would need to query its database 52 in real-time. This application would enable vast reduction in the capacity requirements of network and server resources that service credit card validation now presently consume. Again, the card reader 48 would determine the age of the card validity status certificate and decide if it is fresh enough (perhaps based on the amount of the charge). If the status information was not sufficient fresh, the card reader 48 could obtain fresh validity status information from the credit card status authority 50 and write it to the credit card 44.

Those skilled in the art may make various other modifications and changes that will embody the principles of the invention and fall within the spirit and scope thereof.

What is claimed is:

1. A method for obtaining and storing on an electronic commerce participant's network device digitally signed information that certifies the value of certain other information associated with the participant, including the validity of one or more of the participant's credentials for delivery by the participant to other parties to the electronic commerce, thereby enabling the other party to validate the other information without consulting a third party, comprising the steps of:

receiving at a Validity Status Authority connected to a network an inquiry concerning the validity status of information associated with the participant;

checking, by the Validity Status Authority, whether the information is valid;

encoding a block of data ("a Cookie") by the Validity Status Authority and transmitting the Cookie for embedding within the participant's device, the Cookie including a plurality of attributes for validating the participant information such that the Cookie, when transmitted to another party during electronic commerce, will allow that other party to determine the validity of the other information associated with the participant without consulting a third party.

2. The method according to claim 1 wherein the Status Authority receives an inquiry from the participant seeking validation of a public key certificate held by the participant.

3. The method according to claim 2 wherein the Status Authority checks whether the public key certificate held by the participant constitutes a valid public key certificate.

4. The method according to claim 2 wherein the Status Authority encodes the Cookie to include a plurality of attributes regarding the public key certificate.

5. The method according to claim 4 wherein the Status Authority encodes the Cookie to includes an attribute that indicates the revocation status of the public key certificate.

6. The method according to claim 4 wherein the Status Authority encodes the Cookie to include an attribute that indicates the date when the status of the public key certificate assumed its revocation status value.

7. The method according to claim 1 wherein the Status Authority receives an inquiry regarding a participant's status.

8. The method according to claim 7 wherein the Status Authority encodes the Cookie to include a plurality of attributes indicative of the status of the participant.

9. The method according to claim 7 wherein the Status Authority encodes the Cookie to include an attribute that indicates when the participant assumed its current status.

10. The method according to claim 1 wherein the Status Authority receives an inquiry regarding a participant's role.

11. The method according to claim 10 wherein the Status Authority encodes the Cookie to include a plurality of attributes indicative of the participant's role.

12. The method according to claim 10 wherein the Status Authority encodes the Cookie to include an attribute that indicates when the participant assumed its role.

13. The method according to claim 1 wherein the Status Authority receives an inquiry regarding a participant's credit account.

14. The method according to claim 13 wherein the Status Authority encodes the Cookie to include a plurality of attributes indicative of the participant's credit account status.

15. A method for authenticating a participant in electronic commence to enable the participant to access an application on a network though the participant's terminal, comprising the steps of:

receiving at a Certificate Status Authority connected to a network an inquiry from a participant seeking authentication of a public key certificate held by the participant;

checking, by the Certificate Status Authority, whether the public key certificate held by the participant is valid; and if so, encoding a first block of data ("a certificate Cookie") by the Certificate Status Authority and transmitting the certificate Cookie for embedding within the participant's terminal, the Cookie including a plurality of attributes for validating the public key certificate held by the participant;

receiving at an Associate Status Authority connected to the network an inquiry from a participant seeking the participant's status;

determining, by the Associate Status Authority, the participant's status; and encoding a second block of data ("an Associate Status Cookie") by the Associate Status Authority and transmitting the Associate Status Cookie for embedding within the participant's terminal, the Associate Status Cookie including a plurality of attributes including the participant's status.

16. A system for electronic commerce that certifies the value of certain other information associated with a participant, including the validity of one or more of the participant's credentials, to enable another party to validate the other information without consulting a third party, comprising:

a Validity Status Authority connected to a network for receiving an inquiry the validity status of information associated with the participant and for checking whether the information is valid;

means for encoding a block of data ("a Cookie") by the Validity Status Authority for transmitting the Cookie for embedding within a participant's network device, the Cookie including a plurality of attributes for validating the participant information;

means for transmitting the Cookie to another party during electronic commerce so that the other party can determine the validity of the other information associated with the participant without consulting a third party;

means for redirecting the participant to the status authority for a Cookie refresh if the Cookie is deemed too stale by the other party; and means for returning the participant back to the other party with the now-refreshed Cookie.

17. The system according to claim 16 wherein the participant's network device comprises a terminal executing a web browser.

18. The system according to claim 16 wherein the participant's network device comprises a credit card and wherein the means for encoding the Cookie comprises a credit card reader.

19. The method according to claim 1 further including the steps of:

redirecting the participant to the status authority for a Cookie refresh if the Cookie is deemed too stale by the other party; and returning the participant back to the other party with the now-refreshed Cookie.

\* \* \* \* \*

UNITED STATES PATENT AND TRADEMARK OFFICE
CERTIFICATE OF CORRECTION

PATENT NO. : 6,351,812 B1
DATED : February 26, 2002
INVENTOR(S) : Rajendra Datar, Daniel F. Hurley, Vishwa Prasad and Earle H. West It is certified that error appears in the above-identified patent and that said Letters Patent is hereby corrected as shown below:

<u>Title page,</u>
FIG. 1, change "send" to -- sends --.

<u>Column 10,</u>
Line 15, change "includes" to -- include --.
Line 46, change "commence" to -- commerce --.
Line 47, change "though" to -- through --.

Signed and Sealed this

Twenty-third Day of July, 2002

*Attest:*

*Attesting Officer*

JAMES E. ROGAN
*Director of the United States Patent and Trademark Office*